United States Patent [19]

Lim et al.

[11] 4,269,815

[45] May 26, 1981

[54] METHOD OF EXCHANGING SODIUM ZEOLITE

[75] Inventors: John Lim, Anaheim; Warren Huang, San Gabriel; Michael Brady, Studio City, all of Calif.

[73] Assignee: Filtrol Corporation, Los Angeles, Calif.

[21] Appl. No.: 152,704

[22] Filed: May 23, 1980

[51] Int. Cl.³ .......................................... C01B 33/28
[52] U.S. Cl. ................................ 423/328; 252/455 Z
[58] Field of Search ............................ 423/328-330; 252/455 Z

[56] References Cited

U.S. PATENT DOCUMENTS

| | | | |
|---|---|---|---|
| 3,677,698 | 7/1972 | Sherry et al. | 423/328 |
| 4,058,484 | 11/1977 | Alafandi et al. | 252/455 Z |
| 4,085,069 | 4/1978 | Alafandi et al. | 252/455 Z |

*Primary Examiner*—Edward J. Meros
*Attorney, Agent, or Firm*—Philip Subkow; Bernard Kriegel

[57] ABSTRACT

This invention relates to improvements in the processes of exchanging zeolites, particularly zeolites of the faujasite type to reduce their sodium content by a multiple exchange under autogenous superatmospheric pressure.

6 Claims, No Drawings

METHOD OF EXCHANGING SODIUM ZEOLITE

BACKGROUND OF THE INVENTION

As is well known in this art, it is desirable to employ a low sodium containing zeolite in the zeolite matrix compositions which are used in hydrocarbon conversion catalysts.

The procedures for exchanging sodium faujasite zeolites, such as the well known X and Y type, which as formed depending on the silica to alumina ratio has a sodium content (expressed as the equivalent $Na_2O$) per mole of $Al_2O_3$ which ranges upward from about 0.9 $Na_2O$ per $Al_2O_3$. It is generally recognized that it is desirable to exchange zeolites with monovalent cations other than alkali metal cations such as for example hydrogen and ammonium or with polyvalent cations for example Group III B cations preferably rare earth cations or both the monovalent and the polyvalent cations, and thus reduce the sodium content to desirably low levels.

The degree of exchange is desirably sufficient to reduce the $Na_2O$ content to less than about 4 to 5 percent on a volatile free basis. Improved stability of the catalyst in the cracking process is obtained by reducing the sodium content to less than 2% and preferably as low as 0.5 percent $Na_2O$ on a volatile free basis.

Such low sodium levels have been achieved in the prior art for example by first exchanging the type Y sodium faujasite with a monovalent or polyvalent cations to partially reduce the sodium content of the zeolite and thereafter heating the exchange zeolite at a very high temperature to calcine the zeolite, and then further exchanging the calcined zeolite. Such a procedure may cause a substantial alteration in the crystal structure. (See Maher, et al U.S. Pat Nos. 3,293,192, 3,402,991; and Ward 3,781,199, 3,867,277)

Instead of the calcination step, and subsequent exchange, Sherry, U.S. Pat No. 3,677,698, and file history, describes a process of exchanging of a faujasite zeolite at atmospheric temperature and then exchanging the zeolite at a very high temperature.

Alafandi, et al U.S. Pat. Nos. 4,058,484 and 4,085,069, have described an exchange procedure at autogeneous pressure to reduce the zeolite sodium content to a low percentage.

STATEMENT OF THE INVENTION

According to our invention, the process of exchanging a zeolite of the faujasite type, having a $SiO_2/Al_2O_3$ ratio in excess of 3, known in this art as a sodium Y, under autogenous pressure at temperatures above the atmospheric boiling point of the salt solutions employed in the exchange, may be conducted with an economic use of the amount of the exchange cation salts to produce the low sodium zeolites. An improved result may be obtained by carrying out the high temperature autogenous pressure exchange by employing a multistage exchange, each stage under autogenous pressure at a temperature above the atmospheric boiling point, with a separation of the exchanged zeolite from the solution of salts between stages. We have found that by so doing, we can obtain a reduction in the sodium content to 2% or less of the exchanged Y expressed as the equivalent $Na_2O$ on a volatile free basis, and to conduct this exchange at temperatures at which the crystalline nature of the faujasite zeolite is preserved.

The crystalline nature of the Y zeolite is preserved in the process of our invention by holding the temperature of the exchange to substantially less than 500° F. and preferably less than about 450° F. The time at the temperature of exchange is held preferably to a minimum.

This may be accomplished by exchanging the Y zeolite at a temperature above the boiling point of the solution at atmospheric pressure and separating the zeolite from the solution, substantially as soon as the solution containing the zeolite and the salt solution attains the selected temperature, and then promptly cooling the mixture and promptly filtering the exchanged zeolite. To further reduce the sodium content, we re-exchange the zeolite removed from the initial exchange process in further stages of exchange each at a superatmospheric pressure at like or higher temperature than in the previous stage, as described above.

By limiting the initial autogenous pressure exchange of the sodium Y to reduce the sodium content partially, the salt requirement to reduce the sodium to substantially lower values in subsequent stages of autogenous pressure may be minimized.

The initial exchange (first exchange) at superatmospheric pressure and temperature substantially less than 500° F., in the range of about 300° F. reduces the sodium content (expressed as $Na_2O$) to the range of about 4 to about 6 percent by weight on a volatile free basis. The exchanged zeolite is separated from the solution as by filtration and in a subsequent re-exchange of the exchanged zeolite at like temperature (second exchange) to reduce the sodium content of the zeolite to the range of less than about 4 to about 2.5% by weight (expressed as $Na_2O$) on a volatile free basis. We have also found that by a subsequent and third exchange under the same conditions the sodium content may be reduced to a range of below about 2 percent by weight as $Na_2O$ on a volatile free basis, and substantially complete exchange of the sodium for example 0.003% by weight expressed as the equivalent $Na_2O$ on a volatile free basis. The equivalents of the exchange cation in each exchange step may be in the ratio of about 2 to 3 times the equivalents of the $Na_2O$ in the zeolite entering the particular stage of exchange. By holding the temperature substantially below 500° F., preferably in the range of 300° F. to 450° F., and holding the time of exposure of the zeolite at said temperature to a practical minimum the crystal structure, both as a fraction of the solids in the mixture which contains the Y zeolite, its surface area and unit cell size are substantially preserved.

In order to preserve the crystalline structure of the Y zeolite, it is desirable to minimize the time at temperature in the exchange process, and hold the temperature of exchange in the range of about 300° to about 450° F., preferably in the range of 350° F. to 400° F. This we may accomplish by interrupting the heating of the mixture of zeolite and salt solution substantially as soon as the temperature of the mixture of the zeolite and salt solution reaches the selected temperature in the above range. Preferably the time at temperature is less than about 15 minutes, or as soon as such separation can be accomplished in the apparatus employed.

In operating at an autogeneous pressure, the mixture of the zeolite and the reactant solutions which may be made at ambient temperature and then without separation of the components of the mixture heated to the selected temperature above the normal boiling point at autogenous pressure when reaching the selected temperature are discharged to atmospheric pressure and filtered to remove the salt solution from the zeolite. We have observed that the exchanged zeolite when so discharged to atmospheric pressure in mixture with the salt solution, in contact with the exchanged zeolite, and has its temperature reduced by indirect cooling or flash evaporation or both, incurs a back reaction by which the sodium content of the zeolite increases as a function of time that the zeolite remains in contact with the salt solution.

We have discovered that instead of reducing the temperature of the mixture of the exchanged zeolite and the salt solution prior to filtration, we can obtain a zeolite of lower sodium content by quenching the mixture by diluting the mixture of the exchanged zeolite and salt solution with a large quantity of water at a much lower temperature and in an amount sufficient to reduce the temperature substantially below the boiling point at the discharge point for example, atmospheric pressure, i.e. in the range of 100° to 212° F., preferably about 180° F. or less.

The effect of quenching as resulting in a substantially lower sodium content as compared with the sodium content of a like exchanged Y when cooled indirectly or by flash evaporation and then filtered as described above, appears primarily in the first stage of high pressure exchange. Quenching does not appear to have a substantial effect on the attained sodium content as compared to the cooling step when the exchange process is conducted on a previously exchanged sodium Y, for example, on a Y zeolite of about less than about 5 to 6% expressed as $Na_2O$ on a volatile free basis. Further, the effect of quenching on the sodium content of the exchanged Y is the result of the high temperature autogenous pressure exchange, as described above.

The step wise exchange, at autogenous pressures according to our invention to reduce the sodium content as above requires substantially lower ratios of the exchanged cation per equivalents of the sodium than has been found to be required to reduce the sodium to the like degree employing a single exchange.

EXAMPLE 1

The following example illustrates the effect of temperature of exchange on the level of sodium content attainable. In the following example the type Y sodium faujasite of the following composition ($SiO_2/Al_2O_3$ ratio of 4.8 and 13.3% $Na_2O$, i.e. 1 $Na_2O:1Al_2O_3$, on a volatile free basis) was dispersed in water acidified to a pH of 5 with sulfuric acid, mixed with ammonium sulfate in the following ratios [2.47 equivalents of $(NH_4)_2SO_4$ per equivalent of $Na_2O$ in the quantity of zeolite used in making the mixture] equilibrated at ambient temperature for an hour, and an aliquot sample removed. It was filtered and washed until the wash water was substantially sulfate free. The remaining mixture was heated in an autoclave to sucessively higher temperatures while thoroughly stirred. As soon as the mixture reached the designated temperature, as indicated in the following table, an aliquot portion of the mixture was removed. In each case the aliquot sample was immediately cooled to 185° F. and quickly filtered and washed as above.

The table states the level of the sodium in the filter cake of the samples, expressed as the weight percent $Na_2O$ on a volatile free basis.

| Temperature of Exchange | % $Na_2O$ | |
|---|---|---|
| 70° | 5.15 | |
| 250° | 5.01 | |
| 275° | 5.03 | |
| 350° | 4.77 | (average) |
| 375° | 4.78 | (average) |
| 400° | 4.50 | |
| 425° | 4.68 | |

EXAMPLE 2

This example illustrates the improvement obtained by sequential high temperature, autogeneous exchanges with intermediate filtration.

In this example the sodium Y, Example 1 was first exchanged with ammonium sulfate in the ratio of 2.47 equivalents of $NH_4$ per equivalent of $Na_2O$ in the zeolite, and heated to the temperature indicated in the following table. As soon as the temperature was reached, it was discharged to ambient pressure, cooled to 185° F. and quickly filtered. The sample was throughly washed to remove the sulfate salts. This is sample (Np). This sample was again exchanged in the autoclave with like ratio of equivalents of $Na_2O$ in the zeolite entering the second exchange, and similarly filtered and washed. This is sample $(Np)_2$. Sample $(Np)_2$ was similarly exchanged in a third exchange with the like ratios ammonium sulfate to the sodium in the zeolite entering the third exchange process, and filtered and this is Sample $(Np)_3$. Sample $(Np)_3$ was similarly exchanged at like ratios of ammonium sulfate to the sodium of the $(Np)_3$, and filtered to give Sample $(Np)_4$. The sodium content of each sample is stated in the table, expressed as the weight percent $Na_2O$ on a volatile free basis.

| SAMPLE | 350° F. $Na_2O$ | 425° F. $Na_2O$ |
|---|---|---|
| Sodium Y | 13.30% | 13.30% |
| $(Np)_1$ | 4.90% | 4.68% |
| $(Np)_2$ | 3.13% | 2.53% |
| $(Np)_3$ | 2.36% | |
| $(Np)_4$ | 1.81% | |

The following example illustrates the effect of the reverse exchange of the mixture of the exchanged zeolite and the salt solution resulting from the exchange of the unexchanged sodium Y such as for example sample Np of Example 2.

EXAMPLE 3

In the following example, a sample exchanged as in Example 2, using in one case a mixture containing 10% by weight of the sodium Y (on a volatile free basis) in the solution and in another case 15% of the sodium Y (on a volatile free basis) for the production of Sample (Np) of Example 2 at 350° F. The resultant mixtures were cooled to the temperature indicated in the table below, and held for various periods of time at the indicated temperature. Aliquot portions were taken at time intervals as indicated in the following table and filtered, washed to remove soluble salts. Each filter cake was analyzed.

The following table gives the sodium content as percent $Na_2O$ (on a volatile free basis), as above in the filter cake of each sample after holding the exchanged zeolite in contact with the salt solution for various times prior to filtration as above.

| Time minutes | Exchange at 15 wt. % 110° F. | Exchange at 10 wt. % solids 185° F. |
| --- | --- | --- |
| 0 | 4.84 | 4.70 |
| 10 | 4.90 | — |
| 20 | 4.93 | 4.8 |
| 30 | 4.94 | 4.88 |
| 45 | 5.05 | 4.95 |
| 60 | 5.05 | 4.75 |
| 75 | — | 5.18 |
| 90 | 5.12 | 5.2 |
| 120 | 5.18 | 5.08 |

The effect of quenching on the preservation of the low sodium levels attained in the stages of the autogeneous exchange shown in the following example.

EXAMPLE 4

Example 1 was repeated but instead of discharging the entire sample of the exchanged sodium Y to atmospheric pressure, and filtering as in Example 1, only one portion of the reaction mixture was cooled to 185° F., discharged from the autoclave, filtered and washed as in Example 1. This process of cooling and separation required less than one minute. Another portion of the reaction mixture was immediately quenched. That is, the reaction mixture as discharged to atmospheric pressure was mixed with an equal volume of water at ambient temperature (70° F.) and filtered and washed as above.

The sodium content of the quenched sample and the cooled sample taken when the exchange solution was produced by heating to temperature indicated and then discharged to ambient pressure and each sample treated as above, is given in the following table.

| Temperature °F. | Cooling % Na$_2$O | Quenching % Na$_2$O |
| --- | --- | --- |
| 250 | 5.01 | 4.87 |
| 300 | 4.79 | 4.34 |
| 350 | 4.73 | 4.30 |
| 375 | 4.72 | 4.25 |
| 400 | 4.50 | 4.31 |
| 425 | 4.68 | 4.15 |

This represents and average of about 0.5% Na$_2$O as between the cooled sample and the quenched sample. The quenching of the reaction mixture prior to filtration results in a substantially lower sodium content as compared with the filtering the indicated cooled reaction mixture. This difference is substantially that which is the difference between ambient exchange and exchange at 425° F. (See Ex. 1), and between the third and forth exchange step as in Example 2. Thus, the low level of sodium content can be obtained with lesser exchange steps or lower temperature of exchange by quenching the sodium Y which has been exchanged at autogeneous pressures.

The following Example shows that the advantage obtained by quenching is in practical effect attained in exchanges at superatmospheric pressure, and is of substantially lesser effect in exchanges at temperatures less than the atmospheric boiling point of the salt solution.

EXAMPLE 5

A type Y sodium faujasite (SiO$_2$/Al$_2$O$_3$ ratio 4.8, 13.3% Na$_2$O) was mixed with (NH$_4$)$_2$SO$_4$ in the ratio of 2.47 equivalents per equivalent of Na$_2$O in the zeolite and equilibrated at ambient temperature for an hour at a pH of 4.2, and a portion of the slurry then heated to 180° F. A sample of the exchanged mixtures was removed, immediately filtered and thoroughly washed to remove soluble salts and another portion was immediately quenched with an equal volume of water at ambient temperature and filtered and washed as above. The sodium content of the filter cake produced was as follows:

|  | Temperature of Exchange | % Na$_2$O |
| --- | --- | --- |
| Filtered | 180° F. | 5.10% |
| Quenched | 180° F. | 5.09% |

This may be compared with the effect of quenching on exchanges at autogeneous pressure as in Example 4.

In carrying out our preferred method, the sodium faujasite Y is mixed with the chosen salt solution as exemplified with the salt of Example 1. The mixture thus attained is inserted into an autoclave and heated to the selected temperature and when the temperature is reached, the mixture is discharged from the autoclave. The exchange may be carried out with a solution of a salt of a monovalent cation other than an alkali metal cation, such as H or NH$_4$, or a polyvalent cation such as an alkaline earth or aluminum or rare earth cations. The preferred salts are ammonium salt, for example the sulfate, or with rare earth salt such as the chloride or sulfate. The zeolite slurry is mixed at ambient temperatures and heated in a closed chamber (an autoclave) to a temperature substantially less than 500° F., that is, temperatures in the range of about 300° F. to less than about 450° F., preferably about 350° F. to about 400° F. The mixture, substantially as soon as it reaches the chosen temperatures, is discharged to atmospheric temperature while being quenched with colder water at a temperature and in quantity to reduce the temperature of the mixture to a temperature of the range of 100° F. to 200° F., for example, 150° to 190° F. The quenched mixture is filtered and the filter cake may but need not be washed. The ratio of the exchange cation to the sodium in the zeolite and the temperature of exchange is adjusted to produce a first stage filter cake having a sodium content (expressed as the equivalent Na$_2$O on a volatile free basis) in the range of about 4% to about 6%, preferably about 4% to about 5%. The filtration should be carried out as promptly as is convenient. Preferably the filter cake is redispersed in a solution of salts, for example, such as has been used in the first exchange or a different salt, and heated in a closed chamber to a temperature under 500° F. in the preferred range of about 300° to 400° F. as in stage one and when the selected temperature is attained, the exchanged zeolite again separated from the mother liquor. At this stage, the quenching may but need not be used. This procedure may be repeated in as many stages as is desired to reduce the sodium content to as low as desired in the range of for example 2% to 0.05% Na$_2$O, on a volatile free basis, as above. It may, but need not be, quenched by mixing with water prior to or after the discharge from the high pressure zone to ambient pressure.

In carrying out the exchange of a sodium Y as above, we prefer to discharge the mixtures from the closed chamber promptly after the mixture has reached the maximum temperature chosen for the exchange, for example, 300°–400° F., preferably 350° F. The quenching water is introduced into the discharge line from the closed chamber where the exchange of the sodium Y is carried out. It is then filtered and the filter cake washed. Depending on the level of sodium to be obtained, the exchange may be repeated, at like or more elevated temperature quenching the reaction mixtures in each stage as described as above. Quenching may need not be used in the exchange slips following the initial exchange of type Y zeolite.

By employing multiple stages of exchange, under autogeneous pressures, none which is at a temperature above 450° F. and limiting the time at the maximum temperature to which the exchange solution is in the presence of the zeolite at the attained temperatures in each stage and limiting the degree of exchange in each step, we are able to preserve the structural integrity and identity of the crystal structure in surface area and silica to alumina ratio and its $a_o$ as shown by the significant x-ray line, and also its concentration. That is, there is substantially no distruction of the zeolite.

The exchange zeolite produced by the process of our invention are useful in forming fluid cracking catalysts by combining them with a matrix as in the case of prior art faujasite zeolites of like sodium content. (See the above Alafandi, et al patent, and Lim, et al U.S. Pat. No. 4,086,187.)

We claim:

1. A process of exchanging a sodium Y which comprises forming a mixture of sodium Y and a water solution of a salt of a cation chosen from the group consisting of monovalent cation other than an alkali metal cation and a polyvalent cation, heating said mixture under autogenous pressure to a selected temperature in the range of about 300° F., and substantially less than 500° F., to reduce the sodium content of the zeolite to the range of about 4% to about 6% (expressed as the equivalent $Na_2O$) on a volatile free basis, quenching the mixture of exchanged Y and salt solution by adding water at a substantially lower temperature in amounts to reduce the temperature to less than the boiling point, and separating the exchanged Y zeolite and re-exchanging the exchanged zeolite by mixing the separated zeolite with a water solution of a salt of a cation chosen from the above group at a temperature in the range of about 300° F. to substantially less than 500° F., and separating said exchanged Y.

2. A process of exchanging a sodium Y which comprises forming a mixture of sodium Y and a water solution of a salt of a cation chosen from the group consisting of monovalent cation other than an alkali metal cation and a polyvalent cation and heating said mixture under autogenous pressure at a selected temperature in the range of about 300° F. to about 450° F., to reduce the sodium content of the zeolite in the range of about 4% to about 6% (expressed as the equivalent $Na_2O$) on a volatile free basis, adding water at a substantially lower temperature in amounts to reduce the temperature to less than the boiling point, and separating the exchanged Y from the salt solution, and re-exchanging the exchanged zeolite by mixing the separated zeolite with a water solution of a salt of a cation chosen from the above group under autogenous pressure at a temperature in the range of about 300° to about 450° F., and separating said exchanged Y.

3. A process of exchanging a sodium Y which comprises forming a mixture of sodium Y and a water solution of a salt of a cation chosen from the group consisting of monovalent cation other than an alkali metal cation and a polyvalent cation at ambient temperature and heating said mixture under autogenous pressure to a temperature in the range of about 300° F. to about 450° F., said cations being in the ratio of equivalents of the said cations to the equivalents of sodium in the Y entering said exchange in the range of about 2 to about 3, to reduce the sodium content of the zeolite in the range of about 4% to about 6% (expressed as $Na_2O$) on a volatile free basis, adding water at a substantially lower temperature in amounts to reduce the temperature to less than the boiling point, and separating the exchanged Y from the salt solution and re-exchanging the exchanged zeolite by mixing the separated zeolite with a water solution of a salt of a cation chosen from the above group under autogenous pressure at a temperature in the range of about 300° F. to about 450° F. and said cations being in the ratio equivalents of the said cations to the equivalents of sodium in the Y entering said exchange in the range of about 2 to about 3, and separating said exchanged Y from said last named exchange.

4. A process of exchanging a sodium Y which comprises forming a mixture of sodium Y and a water solution of a salt of a cation chosen from the group consisting of monovalent cation other than an alkali metal cation and a polyvalent cation at ambient temperature and heating said mixture under autogenous pressure to a temperature in the range of about 300° F. to about 450° F., employing a ratio of equivalents of said cation to the sodium in the Y entering said exchange in the ratios of about 2 to about 3, to reduce the sodium content of the zeolite in the range of about 4% to about 6% (expressed as the equivalent $Na_2O$) on a volatile free basis, adding water at a substantially lower temperature in amounts to reduce the temperature to less than the boiling point, and separating the exchanged Y zeolite and re-exchanging the exchanged zeolite by mixing the separated zeolite with a water solution of a salt of a cation chosen from the above group under autogenous pressure at a temperature in the range of about 300° to about 450° F., the ratio of equivalents of said cation to the Y entering said last named exchange of about 2 to about 3, separating the Y from the said last named salt solution, said separated Y having a sodium content in equivalent $Na_2O$ on a volatile free basis in the range of less than about 4 to about 2.5% by weight.

5. A process of exchanging a sodium Y which comprises forming a mixture at ambient temperature, of sodium Y and a water solution of a salt of a cation chosen from the group consisting of a polyvalent cation and a monovalent cation other than an alkali metal cation and heating said mixture under autogenous pressure to a temperature in the range of about 300° F. to about 450° F., the ratio of equivalents of said chosen cation to the sodium in the Y entering said exchange being in the ratios of about 2 to about 3, and reducing the sodium content of the Y to a content in the range of about 4% to about 6% (expressed as the equivalent $Na_2O$ on a volatile free basis), adding water to said heated mixture, said water being at a substantially lower temperature and in amounts to adjust the temperature of said mixture and said added water to less than the boiling point, and separating the exchanged Y zeolite from the salt solution and re-exchanging the exchanged Y by mixing the separated Y with a water solution of a salt of a cation chosen from the above group and heating the same under autogenous pressure at a temperature in the range of about 300° to about 450° F., the ratio of equivalents of said cation to the sodium in the exchanged Y entering said last named exchange being about 2 to about 3, separating exchanged Y from the said last named salt cation or solution, said last named separated exchanged Y having a sodium content (expressed in equivalent $Na_2O$ on a volatile free basis) in the range of less than about 4 to about 2.5% by weight, mixing said last named separated Exchanged Y with a salt solution of the above cation or cations, the equivalents of the said last named cation to the equivalents of the sodium in the said last named separated exchanged Y, being in the range of about 2 to about 3, heating said last named mixture under autogenous pressure to a temperature in the range of about 300° to about 450° F., and separating an exchanged Y having a sodium content (expressed as $Na_2O$ on a volatile free basis) of less than about 2% by weight on a volatile free basis.

6. The process of claims 1, 2, 3, 4, or 5, in which in each exchange the temperature of the mixture of the Y and the salt solution is reduced promptly as the temperature of the mixture of the Y and the salt solution has reached the temperature in the said range.

* * * * *